United States Patent

Itou et al.

[11] Patent Number: 5,898,263
[45] Date of Patent: Apr. 27, 1999

[54] PIGMENT DISPERSION COMPOSITION, DISPLAY APPARATUS, AND METHOD OF MANUFACTURING THE APPARATUS

[75] Inventors: Takeo Itou, Kumagaya; Hidemi Matsuda, Fukaya; Hisashi Chigusa, Urawa; Kazuo Sakai, Kawanishi; Masaru Fukuda, Osaka, all of Japan

[73] Assignees: Kabushiki Kaisha Toshiba, Kawasaki; Fuji Pigment Co., Ltd., Kawanishi, both of Japan

[21] Appl. No.: 08/969,575

[22] Filed: Nov. 13, 1997

Related U.S. Application Data

[63] Continuation of application No. 08/692,156, Aug. 5, 1996, abandoned, which is a continuation of application No. 08/318,992, Oct. 6, 1994, abandoned.

[30] Foreign Application Priority Data

Oct. 8, 1993 [JP] Japan .................................. 5-253022

[51] Int. Cl.⁶ .............................. H01J 29/10; G21F 1/10
[52] U.S. Cl. ......................... 313/474; 313/466; 313/478; 313/479; 430/25; 430/27; 523/136
[58] Field of Search .............................. 523/136; 430/25, 430/27; 313/466, 474, 478, 479

[56] References Cited

U.S. PATENT DOCUMENTS

| | | | |
|---|---|---|---|
| 3,585,207 | 6/1971 | Repsher | 252/356 |
| 3,965,278 | 6/1976 | Duinker et al. | 313/466 |
| 4,067,837 | 1/1978 | Miller | 427/435 |
| 4,853,274 | 8/1989 | Makishima et al. | |
| 5,374,501 | 12/1994 | Holmes et al. | |

FOREIGN PATENT DOCUMENTS

| | | |
|---|---|---|
| 0129329 | 12/1984 | European Pat. Off. . |
| 48-17263 | 3/1973 | Japan . |
| 52-63060 | 5/1977 | Japan . |
| 52-77578 | 6/1977 | Japan . |
| 53-65654 | 6/1978 | Japan . |
| 53-69577 | 6/1978 | Japan . |
| 56-160746 | 12/1981 | Japan . |
| 647457 | 1/1989 | Japan . |
| 775202 | 5/1957 | United Kingdom . |
| 1178839 | 1/1970 | United Kingdom . |

OTHER PUBLICATIONS

Datebase WPI, Week 8829, Derwent Publications Ltd., London, GB, AN 88–200214 & JP–A–06 313 480 (Toshiba KK), Jun. 7, 1988.

Datebase WPI, Week 7849, Derwent Publications Ltd., London, GB, AN 78–88855A & JP–A–53 125 984 (Dainippon Tokyo KK), Nov. 2, 1978.

Datebase WPI, Week 8412, Derwent Publications Ltd., London, GB, A 84071687 & JP–A–59 025 874 (Tokyo Shibaura), Feb. 9, 1984.

*Primary Examiner*—Andrew E. C. Merriam
*Attorney, Agent, or Firm*—Pillsbury Madison & Sutro LLP

[57] ABSTRACT

The pigment dispersion composition having a good dispersibility, a good transparence and an anti-coating properties, which contains 0.5 to 50 parts by weight of an inorganic pigment, at least one type of dispersant selected from the group consisting of a sodium salt, an ammonium salt and an amine salt of an acrylic resin, an acryl copolymer resin, a polycarbonic acid, a condensation product of aromatic formalin sulfonate, and water or a solvent miscible with water.

20 Claims, 1 Drawing Sheet

PIGMENT DISPERSION COMPOSITION, DISPLAY APPARATUS, AND METHOD OF MANUFACTURING THE APPARATUS

This is a continuation of application Ser. No. 08/692,156, filed on Aug. 5, 1996 now abandoned, which is a continuation of U.S. Ser. No. 08/318,992, filed on Oct. 6, 1994 now abandoned.

BACKGROUND OF THE INVENTION

1. Field of the Invention

The present invention relates to a pigment dispersion composition having a good dispersibility and a good transparence, with such excellent anti-coating properties that the composition does not have an adverse influence on other materials, i.e. soaking into other coatings. The present invention further discloses a display apparatus such as a cathode ray tube and a method of manufacturing the apparatus.

2. Description of the Related Art

A color cathode ray tube is an example of a display apparatus for displaying an image by using emitting light from a phosphor layer. Conventionally, various methods for improving the contrast or color purity of such a display device have been proposed.

For example, Jpn. Pat. Appln. KOKAI Publications Nos. 48-17263, 52-63060 and 64-7457 each disclose a method in which a pigment layer having the same color as that of the emitting color from the phosphor layer is provided between the face plate and the phosphor layer.

Further, Jpn. Pat. Appln. KOKAI Publication No. 52-77578 discloses a method of forming a pigment layer by adding a pigment into a pre-coating solution before the phosphor layer is applied. Jpn. Pat. Appln. KOKAI Publications Nos. 53-69577 and 56-160746 each mention a method of embedding phosphor particles into a pigment layer which was made sticky.

Jpn. Pat. Appln. KOKAI Publication No. 53-65654 discloses that a phosphor screen is formed by forming a pigment layer containing a binder in the inner surface of a panel and then applying a phosphor suspension containing a photo-sensitive binder on the pigment layer, thereafter exposing the suspension to light and developing.

However, the above-described methods entail the below-described drawbacks, and therefore it is difficult to actually employ such a phosphor film having a pigment filter layer. First, the transparence of the pigment layer is insufficient, and the performance of the filter is poor, thus making it not possible to achieve good contrast properties. Second, the method involves a limited condition for work, and therefore defect-free filter layers cannot be constantly obtained.

According to the method of manufacturing a phosphor screen disclosed in Jpn. Pat. Appln. KOKAI Publication No. 64-7457, the pigment layer is formed by the slurry method, and after a while, the phosphor layer is formed by further using the slurry method. As a result, the number of the steps involved is twice as many as a general method, and the production cost is increased.

SUMMARY OF THE INVENTION

The present invention has been proposed in consideration of the drawbacks of the conventional techniques.

The first object of the invention is to provide a pigment dispersion composition having a good dispersibility and a good transparence, with such excellent anti-coating properties that the liquid composition does not have an adverse influence on other materials, i.e. soaking into other coatings.

The second object of the invention is to provide a display apparatus including a phosphor screen with a filter by using a pigment dispersion composition. The phosphor screen has a pigment layer with the same color as the emitting color from each phosphor layer. The pigment layer is located between the face plate and the phosphor layer and has, a good transparence and, a good filter performance. This means that light emitted from phosphor can be transmitted through the filter while the other light can be absorbed in the filter.

The third object of the invention is to provide a method of manufacturing a display apparatus including a phosphor screen with a filter, using a pigment dispersion composition, having a good transparence, good filter performance, and contrast properties. This method, does not allow color contamination, is easily accomplished at a low cost.

The pigment dispersion composition of the present invention has a good dispersibility and anti-coating properties. A high dispersibility indicates good filter properties, and an excess pigment dispersion composition applied to an undesired part in the patterning step can be easily removed. When the anti-coating properties are good, high filter properties can be obtained. This is because the pigment dispersion composition does not seep out into the phosphor layer.

When the pigment dispersion composition is used in the display device of the present invention, improved a brightness, contrast characteristics and color purities, are obtained.

Because the pigment dispersion composition has good anti-coating properties, it is not necessary to add a photoresistor. Consequently, with the method of the present invention, another coating layer containing the photoresist can be formed on a coating layer of the pigment dispersion composition without the just mention treatment. Therefore, it only suffices that a patterning is performed on the photoresist-containing layer, so as to pattern the photoresist-containing layer together with the coating layer of the pigment dispersion composition. In the case where the photoresist-containing layer also contains phosphor, a phosphor layer can be formed by performing a development process and an exposure step. Thus, according to the present invention, the manufacturing steps can be facilitated without deteriorating the filter effect of the pigment layer, or the light emitting efficiency of the phosphor layer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWING

The accompanying drawings, which are incorporated in and constitute a part of the specification, illustrate the preferred embodiments of the invention, and together with the general description given above and the detailed description of the preferred embodiments given below, serve to explain the principles of the invention.

DETAILED DESCRIPTION OF THE PREFERRED EMBODIMENTS

The inventors of the present invention carried out studies for simplifying the manufacturing step for the display apparatus having a filter between the face plate and the phosphor, by adding a step of coating the pigment dispersion composition, and performing the exposure/development step of the pigment layers simultaneously after the application of the phosphor layer. Further, the inventors focused on the dispersant for the pigment dispersion composition used for forming the pigment layer, and studied the influence of the dispersant on patterning. The results of the studies are summarized in TABLE 1.

TABLE 1

|  |  | Trans-parence | Anti-overcoat property | Underlayer adhesion property | |
|---|---|---|---|---|---|
|  |  |  |  | Exposed portion | Not exposed portion |
| Without dispersant | | Poor | Fair | Fair | Fair |
| With dis-persant | Anionic Na salt | Good | Fair | Good | Good |
| | NH$_4$ salt | Good | Good | Good | Fair |
| | Nonionic | Fair | Fair | Poor | Good |
| | Anionic Na salt and anionic NH$_4$ salt | Good | Good | Good | Good |
| | Anionic NH$_4$ salt and nonionic agent | Good | Good | Good | Good |

In TABLE 1, transparence is evaluated according to whether the pigment filter formed of a pigment layer has sufficient transparence. In order to maintain the transparency, it is required that the diameter of the pigment particles be several hundred nanometers or less, preferably, several tens of nanometers, and the particles be dispersed uniformly in the filter layer, and be maintained after application. In the case where a high transparency is not maintained, the contrast and color purity are degraded due to scattering of light, even if there is an attempt of improving the contrast and color purity by using the pigment having the filter properties.

The anti-overcoating properties are evaluated according to whether the pigment layer becomes defective. This can happen if the pigment layer melts into the phosphor slurry or part of the phosphor slurry mixes into the pigment layer. This may take place in the step for forming a pigment layer and forming a coating layer.

The underlayer adhesion property is evaluated according to whether the exposed portion has sufficient adhesion properties and whether the non-exposed portion has sufficient removing properties.

Figure 1:
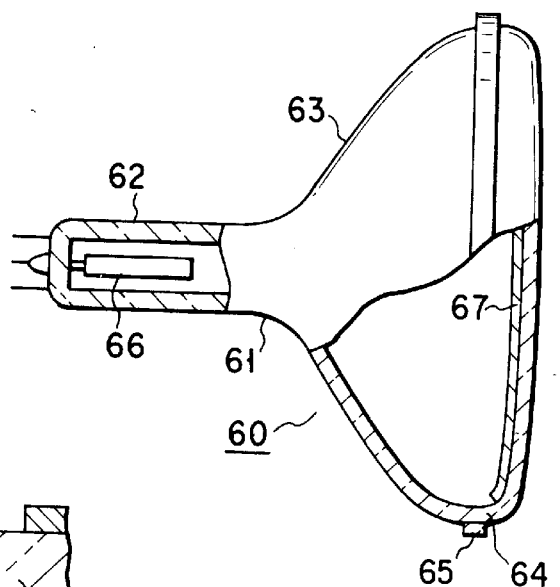
FIG. 1 is a schematic diagram showing an example of the display apparatus according to the present invention.

According to the experiments of the present inventors, the pigment particles were prevented from agglomeration by using a suitable dispersant in the pigment composition, thus improving the transparence. Particularly, in the case where an anionic dispersant was used, it was confirmed that the anti-overcoat properties and the underlayer adhesion properties, which were the rest of the necessary characteristics, could be improved to a practical level at the same time. However, as shown in FIG. 1, in the case of Na salt, the anti-overcoat properties are somewhat poor. In the case of NH$_4$ salt, the underlayer adhesion property in the non-exposed portion is poor. The conditions for work are limited. Better properties can be obtained when the dispersants are mixed.

Based on the above results, the synergetic effect in the case where the dispersants were mixed in was examined. It was found that all of the above properties were improved in the case where the mixed ratio (anionic Na salt/anionic NH$_4$ salt) was in a range of 7/3 to 10/0. It was also found, with respect to the combination of a nonionic dispersant and an anionic NH$_4$ salt, that all of the above properties were improved in the case where the mixed ratio (nonionic dispersant/anionic NH$_4$ salt) was in a range of 1/30 to 1/300.

The reason why the mixtures of dispersants exhibit good properties can be explained as follows. The anionic NH$_4$ salt becomes a coating film which is insoluble in water as NH$_3$ evaporates during the formation of the film. The anionic Na salt does not evaporate during the formation of the film, and remains in the coating film as Na salt, rendering the coating film water-soluble. Therefore, the characteristics of the coating film with respect to water can be controlled by appropriately setting the mixed ratio at appropriate values. Further, the nonionic dispersant is highly soluble in water, and therefore with its addition to the anionic NH$_4$ salt in the application liquid in a small amount, the film which has been insoluble in water becomes somewhat soluble.

The pigment dispersion composition according to the first embodiment of the present invention has been derived from the various studies of the inventors, and contains at least: i) 0.5 to 50 parts by weight of inorganic pigments; ii) at least one type of dispersant selected from the group consisting of a sodium salt, an ammonium salt and an amine salt of an acrylic resin, an acryl copolymer resin, a polycarbonic acid, a condensation product of aromatic sulfonic acid and formalin; and iii) water or a solvent miscible with water.

The particle diameter of the inorganic pigment should preferably be in a range of 10 to 200 nm. If the grain diameter is less than 10 nm, the agglomeration between pigment particles tends to become too strong, and the particles may not easily be dispersed, whereas if the particle diameter exceeds 200 nm, the transparence tends to be degraded to an insufficient level, lowering the filter properties.

The content of the inorganic pigment should preferably be 3 to 35 wt %. If the content exceeds 35 wt %, the viscosity of the pigment dispersion composition increases, and it tends to be difficult to apply the composition uniformly. If the content is less than 3 wt %, the color tends to be weak, and the filter properties may be degraded.

The content of the dispersant should preferably be in a range of 0.5 to 20 wt %. If the content is less than 0.5 wt %, the dispersion of the pigment tends to become insufficient, and the particle diameter may become large, deteriorating the filter properties. If the content exceeds 20 wt %, the underlayer adhesion properties tends to be enhanced, degrading the patterning quality.

The content of the dispersant with respect to the inorganic pigment should preferably be in a range of 2 to 30 wt %. If the content is less than 2 wt %, the dispersion of the pigment tends to become insufficient, and the particle diameter may become large, deteriorating the filter properties. If the content exceeds 30 wt %, the underlayer adhesion properties tend to be enhanced, degrading the patterning quality.

Examples of the solvent miscible with water are: methyl alcohol, ethyl alcohol, isopropyl alcohol, glycolethers such as ethyleneglycol monobutylether and propyleneglycol monomethylether, polyhydric alcohols, N-methylpyrrolidone 2-pyrrolidone, and N-N-dimethylformamide.

As the dispersant, an anionic dispersant can be used. For example, an anionic Na salt dispersant such as an acrylic agent, an acryl-stylene agent, an acryl copolymer, a polycarbonic acid, or a condensation product of naphthalene sulfonic acid and formalin can be used. Further, an amine salt can be used in place of Na salt. A most preferable dispersant is an acryl copolymer.

Specific examples of the anionic Na salt dispersant are: Dispeck N-40 (Allied Colloid Co.) as an acrylic agent; Demol EP (Kao) or Poiz 520 (Kao) as a high-polymer polycarbonic acid; Demol N (Kao) as a condensation product of naphthalene sulfonic acid and formalin; Demol MS (Kao) as a condensation product of specific aromatic sulfonic acid and formalin; and Elenone No. 19N as an octylphosphatemonoethanol amine acid. The most effective agent of all is an acryl copolymer, and a specific example thereof is Dispeck G-40.

Examples of the anionic $NH_4$ salt dispersant are an acrylic agent, an acryl-stylene agent, an acryl copolymer, a polycarbonic acid, and a polyoxyethylene alkylether sulfate.

Specific examples of the anionic $NH_4$ salt dispersant are: Dispeck A-40 (Alllied Colloid Co.) as an acrylic agent; Discoat N-14 (Dai-ichi Kogyo Seiyaku Co., Ltd.) as a high-molecular polycarbonic acid type; Hitenor 08 (Dai-ichi Kogyo Seiyaku Co., Ltd.) as polyoxyethylene alkylethersulfate; and Lomar PWA (Sunnobco Co., Ltd.) as a condensed naphthalenesulfonic acid. The most effective agent of all is an acryl copolymer, for example, Dispec GA-40 (Allied Colloid Co.).

Examples of the nonionic dispersant which can be used in the pigment dispersion composition of the present invention are: polyoxyethylene laurylether, polyoxyethylene derivative, polyoxyalkylene alkylether, polyoxyethylene nonylphenylether and polyoxyethylene sorbitanmonolaurate. Specific examples thereof are Noigen EA-140 (Dai-ichi Kogyo Seiyaku), Emulgen 106 (Kao) and Leodol TW-L120 (Kao).

Pigments using for the present invention can be selected from inorganic and organic pigments. It is preferable to select those pigments which can be dispersed uniformly in a filter layer of a phosphor screen and allow the filter layer to have good transparency.

Specific examples are iron oxide pigments such as SICOTRANS RED L-2817, 0.01 $\mu$m to 0.02 $\mu$m diameter, available from BASF Inc., anthraquinone pigments such as CROMOPHTAL RED 0.01 $\mu$m diameter, CIBA GEIGY Inc., blue colored cobalt aluminate ($Al_2O_3$—CoO) pigments such as COBALT BLUE X, 0.01 $\mu$m to 0.02 $\mu$m diameter, TOYO-GANRYO Inc., ultramarine colored pigments 0.01 $\mu$m diameter, green colored $TiO_2$—NiO—CoO—ZnO type pigments such as TYPYROXIDE TM-GREEN #3320, 0.01 $\mu$m to 0.02 $\mu$m diameter DAINICHI SEIKA Inc., green colored CoO—$Al_2O_3$—$Cr_2O_3$—$TiO_2$ type pigments such as TYPYROXIDE TM-GREEN #3420, 0.01 $\mu$m to 0.02 $\mu$m, DAINICHI SEIKA Inc., green colored $Cr_2O_3$ type pigments such as ND-801, 0.35 $\mu$m diameter, NIHON DENKO Inc., chlorinated phthalocyanine blue pigments such as FASTOGEN GREEN S, 0.01 $\mu$m diameter DAINIPPON INK Inc., and brominated phthalocyanine green pigments such as FASTOGEN GREEN 2YK, 0.01 $\mu$m diameter, DAINIPPON INK Inc.

To the pigment dispersion composition of the present invention, a water-soluble high polymer such as PVA or PVP, a thermosetting resin such as acryl emulsion, or a crosslinking agent such as ADC or diazonium salt may be added, if necessary.

Phosphors generally used in a cathode ray tube can be used in the present invention.

According to the second embodiment of the present invention, there is provided a display apparatus comprising a face plate; and a phosphor screen including a pigment layer formed on the inner surface of the face plate, by applying a pigment dispersion composition and a phosphor layer formed on the pigment layer, emitting light of the same color as the color of the pigment itself. The pigment dispersion composition 0.5 to 50 parts by weight of an inorganic pigment, at least one kind of dispersant selected from the group consisting of a sodium salt, ammonium salt and amine salt of an acrylic resin, an acryl copolymer resin, a polycarbonic acid, a condensation product of aromatic sulfonic acid and formalin, and water or a solvent miscible with water.

As heat is applied to the pigment layer mainly during the formation of the phosphor layer, a large part of water and dispersant components can be evaporated from the pigment layer. This pigment layer is formed of the pigment dispersion composition of the first embodiment of the invention, which has a good dispersibility, a good transparency and good anti-overcoat properties, and the pigment layer exhibits good filter properties. Further, the pigment dispersion composition has good adhesion properties with respect to a certain part of the substrate while patterning, and good dispersibility. Therefore, it is completely removed from the undesired part of the substrate. According to the second embodiment, the reflection of external light, which takes place between the face plate and the phosphor layer, is suppressed due to a sufficient filter effect of the pigment layer, and the light of a desired color emitting from the phosphor is effectively transmitted. Consequently, the display apparatus according to the second embodiment of the invention has an excellent color purity and a contrast. With pigment dispersion compositions other than the range of the present invention, a pigment layer having such good filter properties cannot be obtained.

FIG. 1 illustrates an example of the display apparatus according to the present invention, and is a partial cutaway side view showing a cathode ray tube manufactured on the basis of the invention. A cathode ray tube 60 has an airtight glass envelope 61 the interior of which is evacuated. The envelope 61 has a neck 62 and a cone 63 continuously extending from the neck 62. In addition, the envelope 61 has a faceplate 64 sealed by a frit glass. An explosion-proof tension band 65 consisting of a metal is wound around the periphery of the side wall of the faceplate 64. An electron gun 66 for emitting electron beams is arranged in the neck 62. A phosphor screen 67 is formed on the inner surface of the face plate 64. The phosphor screen 67 is constituted by a phosphor layer which is excited by electron beams from the electron gun 66 to emit light and a pigment layer formed between the phosphor layer and the inner surface of the face plate 64. A deflection unit (not shown) is arranged outside the cone 63. The pigment layer is obtained by applying a pigment dispersion composition containing 0.5 to 50 parts by weight of an inorganic pigment, at least one kind of dispersant selected from the group consisting of an acrylic resin, an acryl copolymer resin, a polycarbonic acid, and a condensation product of aromatic sulfonic acid and formalin, and water or a solvent miscible with water. The deflection unit serves to deflect electron beams to scan over the phosphor screen.

According to the third embodiment of the invention, there is provided a method for manufacturing a display apparatus, said method comprising a process for forming a phosphor screen, comprising steps of coating a pigment dispersion composition containing 0.5 to 50 parts by weight of inorganic pigment, at least one kind of a dispersant selected from the group consisting of a sodium salt, ammonium salt and amine salt of an acrylic resin, an acryl copolymer resin, a polycarbonic acid, a condensation product of aromatic sulfonic acid and formalin, and water or a solvent miscible with water, on the inner surface of the face plate, and drying to form a coating layer of a pigment dispersion composition; coating a solution containing a photoresist on the coating layer of the pigment dispersion composition to form a coating layer of the photoresist-containing solution; and exposing the photoresist-containing coating layer to the light via a mask pattern, and then developing the coating layer of the pigment dispersion composition and the coating layer of the photoresist-containing solution at the same time.

In the case where phosphor is mixed into a solution containing a photoresist, the exposure and development steps are carried out only once each.

In such a case, the obtained phosphor layer is calcined at a temperature of, for example, around 430° C. after the patterning, thus obtaining a phosphor screen. During the sintering step, much of the dispersants in the coating layers of the photoresist and pigment dispersion composition, and moisture or solvent or the like is evaporated.

In the case where a phosphor is not mixed into a solution containing a photoresist, a phosphor slurry containing a photoresist is coated on the inner surface of the face plate after patterning, and then exposed to light via a mask pattern having a predetermined pattern and developed. After that, the resultant is further calcined at a temperature of, for example, around 430° C., thus obtaining a phosphor screen.

The display apparatus of the present invention using the above-described phosphor surfaces can be obtained by assembling a display apparatus such as a cathode ray tube, and plasma display by the general method.

Next, the present invention will now be described in specific with reference to accompanying drawings. The description will be provided in connection with a color cathode ray tube, taken as a typical example of the display device having a phosphor layer with filter.

FIGS. 2A to 2G are schematic views illustrating steps for forming a phosphor screen using the pigment dispersion composition of the present invention.

Figure 2A:
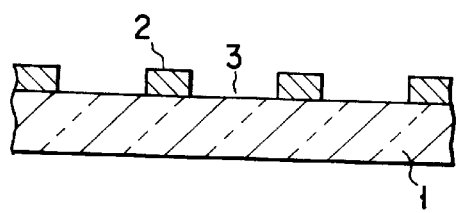
FIGS. 2A to 2G are diagrams showing some of the steps of an example of the manufacturing method for a phosphor screen of the display apparatus according to the present invention.

As can be seen in FIG. 2A, a light absorption layer 2 which was patterned is formed on the inner surface of the a face plate 1 of a color cathode ray tube. More specifically, a resist is coated on the inner surface of the face plate 1 of the color cathode ray tube to form a resist film, and the film is exposed to light via a shadow mask (not shown), developed and dried, so as to leave a stripe-like or dot-like photo-curing film in a site 3 in which a phosphor layer is to be formed. On the photo-curing film, a light-absorbing material such as graphite is coated to bind therewith. Then, the photo-curing film is dissolved by cleaning it with a hydrogen peroxide aqueous solution, and thus the photo-curing film is eliminated together with the light-absorbing material integrated thereon. In the above-described manner, there remains to be formed a light-absorbing layer 2 which is patterned to expose the site 3 in which the phosphor layer is to be formed.

Accordingly, the cobalt blue as a blue color pigment, the cobalt green as a green color pigment, and the red iron oxide as a red color pigment are used along with pigment dispersion liquids of these colors and a phosphor slurry having a composition later described, and patterning are carried out in order. The patterned films were examined in terms of the development properties, the binding properties with respect to a panel, and the soaking condition. The following embodiments are different from each other in the pigment dispersion composition of each color, and the composition of the phosphor slurry, and these embodiment share the same pigment layer forming and phosphor layer forming step as embodiment 1.

Embodiment 1

First, a pigment dispersion composition having the composition listed in TABLE 2 and a phosphor slurry having the composition listed in TABLE 3 were prepared. Pigment dispersion liquids Bp1, Gp1 and Rp1 shown in TABLE 2 were obtained by dispersing each of the pigments, i.e. the cobalt blue, the cobalt green and red iron oxide separately in SG mills for 60 minutes by using zircon beads having a diameter of 0.8 mm, and adjusting the average diameter to 40 nm.

TABLE 2

|  | Bp1 | Gp1 | Rp1 |
| --- | --- | --- | --- |
| Cobalt blue | 20.0g |  |  |
| Cobalt green |  | 20.0g |  |
| Red iron oxide |  |  | 20.0g |
| Dispeck N-40 | 3.0g | 3.0g | 3.0g |
| Pure Water | 77.0g | 77.0g | 77.0g |

TABLE 3

|  | Bs1 | Gs1 | Rs1 |
| --- | --- | --- | --- |
| Blue-color emitting fluorescent substance | 48.0g |  |  |
| Green-color emitting fluorescent substance |  | 48.0g |  |
| Red-color emitting fluorescent substance |  |  | 48.0g |
| Polyvinyl alcohol | 1.5g | 1.5g | 1.5g |
| Surfactant | 1.0g | 1.0g | 1.0g |
| Ammonium dichromate (ADC) | 1.5g | 1.5g | 1.5g |
| Pure water | 48.0g | 48.0g | 48.0g |

Application of the First Color

Figure 2B:
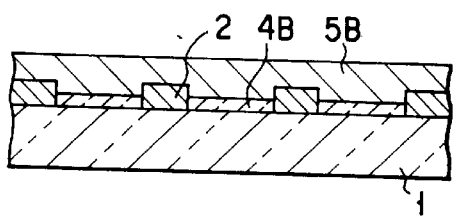
Figure 2E:
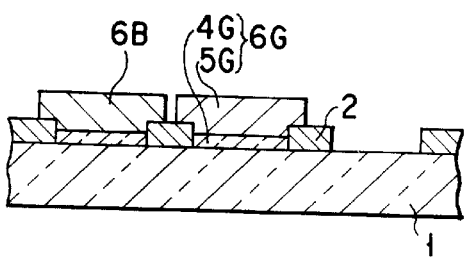
Figure 2C:
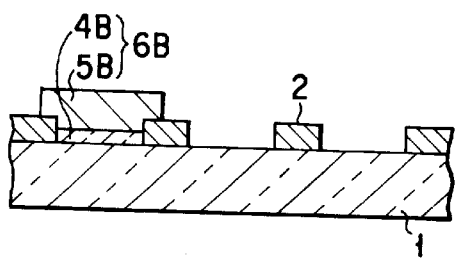

As shown in FIG. 2B, the blue color pigment dispersion composition Bp1 is coated to form a coated layer by spin coating on the light-absorbing layer 2 formed on the inner surface of the face plate 1 by patterning. The coated layer was dried by a heater, thus obtaining a blue color pigment layer 4B. Then, the blue color emitting phosphor slurry Bs1 containing a PVA/ADC resist and ZnS:Ag, C1 phosphor is coated thereon, thus obtaining a blue color emitting phosphor layer 5B. Next, the blue color emitting phosphor layer 5B and the blue pigment layer 4B were patterned at the same time by exposing them to light via a shadow mask (not shown) for development, thus obtaining a blue color emitting phosphor pixel 6B having a blue color filter as shown in FIG. 2C was obtained.

Application of the Second Color

Figure 2F:
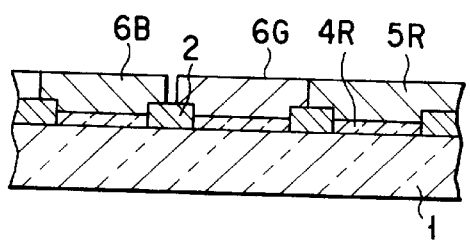
Figure 2D:
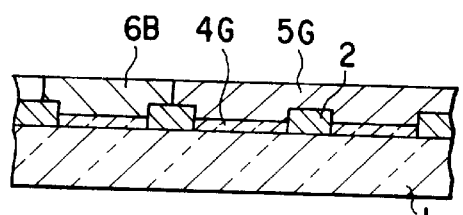

As shown in FIG. 2D, the green color pigment dispersion composition Gp1 is coated on the face plate 1, and the coated composition was dried by a heater, thus obtaining a transparent green color pigment layer 4G. Then, the green color phosphor slurry Bs1 containing a PVA/ADC resist and ZnS:Cu, C1 phosphor is applied thereon, thus obtaining a green color emitting phosphor layer 5B. Next, the green color emitting phosphor layer 5B was exposed to light via the shadow mask for development, thus obtaining a green color emitting phosphor pixel 6B having a green color filter as shown in FIG. 2E.

Application of the Third Color

Figure 2G:
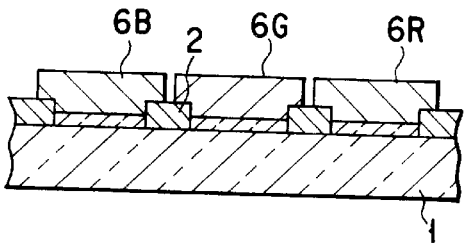

As shown in FIG. 2F, the red color pigment dispersion composition Rp1 is coated on the face plate, and the applied composition was dried by a heater, thus obtaining a red color pigment layer 4R. Then, the red color emitting phosphor slurry Rs1 containing a PVA/ADC resist and 1/2 $O_2S$:Eu phosphor is coated thereon, thus obtaining a red color emitting phosphor layer 5R. Next, the red color emitting phosphor layer 5R was exposed to light via the shadow mask for development, thus obtaining a red color emitting phosphor pixel 6R having a red color filter as shown in FIG. 2G was obtained.

By using the face plate thus obtained, a color cathode ray tube was manufactured by the general method, and the properties thereof were evaluated. The results indicated that the color image receiving tube had a good brightness, a good color purity, and a high contrast. Further, the reflection of external light could be reduced by 50% in exchange for a loss of luminescence of only 15%, and the color reproduction area was expanded by 13%. With the conventional technique, for the same external light reflectance as that of the present invention, the loss of brightness is 25% or more and the expansion of the color reproduction area is only 5%. Further in some cases the films are defective. As compared to the conventional technique, the color image receiving tube manufactured by using the pigment dispersion composition of the present invention has very much improved properties.

Further, in the conventional method, exposure and development are required in the step of patterning a pigment layer to which a photoresist was added, and in the step of patterning a phosphor layer to which a photoresist is added. Accordingly, the exposure and development step has to be carried out twice to obtain one color type of a pixel. However, according to the method of the present invention, the exposure and development can be performed after applying a phosphor slurry on a pigment layer as soon as the pigment layer is formed. Therefore, the exposure and development step is carried out only once to obtain one color type of a pixel. Consequently, with the method of the present invention, the exposure and development step are repeated only three times in order to obtain three colors of pixels. The conventional method requires at least six times as many steps. Thus, the manufacture of a color image receiving tube can be simplified by the present invention.

If a conventional pigment dispersion composition is applied to the method of the present invention, part of the pigment layer is soaked into the phosphor layer, deteriorating not only the filter effect of the pigment layer, but also the light emitting efficiency of the phosphor layer. When the pigment dispersion composition of the present invention is used, part of the pigment layer is not soaked into the phosphor layer. This can achieve a good filter effect without degrading the light emitting efficiency.

Embodiment 2

The above embodiment 1 is a case where only Dispeck N-40, an anionic Na salt dispersant, was used as a dispersant for the pigment dispersion composition. In the second embodiment, only Dispeck A-40, an anionic $NH_4$ salt dispersant, was used. The second embodiment involves the same method and phosphor slurry as that of the first embodiment, except that the pigment dispersion composition has the composition listed in TABLE 4.

TABLE 4

|  | Bp2 | Gp2 | Rp2 |
|---|---|---|---|
| Cobalt blue | 20.0g |  |  |
| Cobalt green |  | 20.0g |  |
| Red iron oxide |  |  | 20.0g |
| Dispeck A-40 | 3.0g | 3.0g | 3.0g |
| Pure Water | 77.0g | 77.0g | 77.0g |

By using the face plate thus obtained, a color cathode ray tube was manufactured, and the properties thereof were evaluated. The results indicated that the color cathode ray tube had a good brightness, a good color purity, and a high contrast. Further, the reflection of external light could be reduced by 50% in exchange for a luminescence loss of only 7%. The color reproduction area was expanded by 15%. Although the second embodiment exhibited slightly better characteristics than those of the first embodiment, the second embodiment involves slightly more detects in removing of the pigment at non-exposed part than the first embodiment to remain some residue.

Embodiment 3

The first and second embodiments only use the anionic Na salt or anionic $NH_4$ salt as a dispersant in the pigment dispersion composition. The third embodiment, however two types of dispersants are mixed.

This embodiment involves the same method and phosphor slurry as the first embodiment except that the pigment dispersion composition has the composition of Bp3, Gp3 and Rp3, as listed in TABLE 5.

TABLE 5

|  | Bp3 | Gp3 | Rp3 |
|---|---|---|---|
| Cobalt blue | 20.0g |  |  |
| Cobalt green |  | 20.0g |  |
| Red iron oxide |  |  | 20.0g |
| Dispeck N-40 | 2.1g | 2.1g | 2.1g |
| Dispeck A-40 | 0.9g | 0.9g | 0.9g |
| Pure Water | 77.0g | 77.0g | 77.0g |

By using the face plate thus obtained, a color cathode ray tube was manufactured, and the properties thereof were evaluated. The results indicated that the color cathode ray tube had a good brightness, a good color purity, and a high contrast. Further, the reflection of external light could be reduced by 50% in exchange for a luminescence loss of only 7%, and the color reproduction area was expanded by 15%. The second embodiment exhibited a high yield.

Embodiment 4

The fourth embodiment is similar to the third embodiment except that the mixed ratio of the anionic Na salt and anionic $NH_4$ salt was varied.

The pigment dispersion composition and the composition of the phosphor slurry used in the fourth embodiment were as shown in TABLES 6 and 7.

TABLE 6

|  | Bp4 | Gp4 | Rp4 |
|---|---|---|---|
| Cobalt blue | 20.0g |  |  |
| Cobalt green |  | 20.0g |  |
| Red iron oxide |  |  | 20.0g |

TABLE 6-continued

|  | Bp4 | Gp4 | Rp4 |
|---|---|---|---|
| Dispeck N-40 | 2.4g | 2.4g | 2.4g |
| Dispeck A-40 | 0.6g | 0.6g | 0.6g |
| Pure Water | 77.0g | 77.0g | 77.0g |

TABLE 7

|  | Bs4 | Gs4 | Rs4 |
|---|---|---|---|
| Blue-color emitting fluorescent substance | 48.0g | | |
| Green-color emitting fluorescent substance | | 48.0g | |
| Red-color emitting fluorescent substance | | | 48.0g |
| Polyvinyl alcohol | 1.4g | 1.4g | 1.4g |
| Surfactant | 1.0g | 1.0g | 1.0g |
| Ammonium dichromate | 1.6g | 1.6g | 1.6g |
| Pure water | 48.0g | 48.0g | 48.0g |

The fourth embodiment exhibited the same results as those of the third embodiment.

Embodiment 5

The fifth embodiment is similar to the third embodiment except that the mixed ratio of the anionic Na salt and anionic $NH_4$ salt was varied.

The pigment dispersion composition and the composition of the phosphor slurry used in the fifth embodiment were as shown in TABLES 8 and 9.

TABLE 8

|  | Bp5 | Gp5 | Rp5 |
|---|---|---|---|
| Cobalt blue | 20.0g | | |
| Cobalt green | | 20.0g | |
| Red iron oxide | | | 20.0g |
| Dispeck N-40 | 2.5g | 2.5g | 2.5g |
| Dispeck A-40 | 0.5g | 0.5g | 0.5g |
| Pure Water | 77.0g | 77.0g | 77.0g |

TABLE 9

|  | Bs5 | Gs5 | Ps5 |
|---|---|---|---|
| Blue-color emitting fluorescent substance | 48.0g | | |
| Green-color generating fluorescent substance | | 48.0g | |
| Red-color generating fluorescent substance | | | 48.0g |
| Polyvinyl alcohol | 1.5g | 1.5g | 1.5g |
| Surface active agent | 1.0g | 1.0g | 1.0g |
| Ammonium dichromate | 1.5g | 1.5g | 1.5g |
| Pure water | 48.0g | 48.0g | 48.0g |

The sixth embodiment exhibited the same results as those of the third embodiment.

As described in the above embodiments 3 to 5, in the case where the mixed ratio between the anionic Na salt and anionic $NH_4$ salt was changed, the PVA/ADC ratio in the phosphor slurry was also changed.

Embodiment 6

The sixth embodiment in which a mixture of the anionic $NH_4$ salt dispersant and nonionic dispersant was used, will be described.

The pigment dispersion composition and the composition of the phosphor slurry used in the sixth embodiment were as shown in TABLES 10 and 11.

TABLE 10

|  | Bp6 | Gp6 | Pp6 |
|---|---|---|---|
| Cobalt blue | 20.0g | | |
| Cobalt green | | 20.0g | |
| Red iron oxide | | | 20.0g |
| Dispeck N-40 | 2.94g | 2.94g | 2.94g |
| Dispeck A-40 | 0.06g | 0.06g | 0.06g |
| Pure Water | 77.0g | 77.0g | 77.0g |

TABLE 11

|  | Bs6 | Gs6 | Ps6 |
|---|---|---|---|
| Blue-color generating fluorescent substance | 48.0g | | |
| Green-color generating fluorescent substance | | 48.0g | |
| Red-color generating fluorescent substance | | | 48.0g |
| Polyvinyl alcohol | 1.6g | 1.6g | 1.6g |
| Surface active agent | 1.0g | 1.0g | 1.0g |
| Ammonium dichromate | 1.4g | 1.4g | 1.4g |
| Pure water | 48.0g | 48.0g | 48.0g |

The sixth embodiment exhibited the same results as those of the third embodiment.

The above embodiments have been described in connection with a color cathode ray tube; however the present invention can be applied to those utilizing the light emission of a phosphor.

Further, the pigment dispersion liquid of the present invention is very advantageous in the case where an appropriate adhesion and an appropriate separability with respect to a glass substrate are required at the same time, and can be applied to various cases apart from the manufacture of a display apparatus.

Embodiment 7

Any of above embodiments perform the patterning step after a pigment layer and a phosphor layer are coated. However, according to the present invention, the patterning step can be performed after a pigment layer and a photoresist layer are coated without phosphor. A more favorable phosphor screen can be obtained in this case although patterning times for forming a phosphor screen may be increased.

In a conventional method of forming a pigment layer, a photoresist is mixed in a pigment dispersion. In a conventional method of forming a pigment layer. However, a drawback of this conventional method is that the transparency of the pigment layer is decreased due to the presence of photoresist in the pigment dispersion.

In this embodiment, the transparency drawback is avoided because the pigment dispersion layer need not contain a photoresist.

In the seventh embodiment, a pigment dispersion composition was prepared according to TABLE 5. A photoresist solution was prepared according to TABLE 3 except that the phosphor component was removed. A phosphor slurry was prepared according to TABLE 3.

First, a blue pigment layer was formed by applying a blue pigment dispersant liquid Bp3. A photoresist solution was coated on the pigment layer and then exposed and developed to form a patterned blue pigment layer. The steps were repeated with a red pigment, and green pigment, respectively, to form a red pigment layer and a green pigment layer.

Next, the phosphor layer was formed on these respective pigment layers by using a conventional method to form a phosphor screen with a filter.

The pigment layer formed as described above had a good patterning property.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A display apparatus comprising:
   a face plate; and
   a phosphor screen comprising a light absorbing pigment layer and a phosphor layer formed on the pigment layer,
   wherein said light absorbing pigment layer permits light emitted from said phosphor layer to be transmitted therethrough, and
   wherein said pigment layer is formed by applying a pigment dispersion composition on the inner surface of the face plate, the pigment dispersion composition comprising
   0.5 to 50% by weight, based on the total amount of said composition, of an inorganic pigment,
   an anionic sodium salt dispersant or anionic amine salt dispersant and an anionic ammonium salt dispersant, and
   water or a solvent miscible with water.

2. A display apparatus comprising:
   a face plate; and
   a phosphor screen comprising a light absorbing pigment layer and a phosphor layer formed on the pigment layer,
   wherein said light absorbing pigment layer permits light emitted from said phosphor layer to be transmitted therethrough, and
   wherein said pigment layer is formed by applying a pigment dispersion composition on the inner surface of the face plate, the pigment dispersion composition comprising
   0.5 to 50% by weight, based on the total amount of said composition, of an inorganic pigment,
   a nonionic dispersant selected from the group consisting of a polyoxyalkylene alkylether, a polyoxyethylene nonylphenylether and a polyoxyethylene sorbitanmonolaurate,
   an anionic ammonium salt dispersant, and
   water or a solvent miscible with water.

3. A display apparatus comprising:
   a face plate having an inner surface;
   a phosphor screen comprising a pigment layer formed by applying a pigment dispersion composition on the inner surface of the face plate, the pigment dispersion composition comprising
   0.5 to 50% by weight, based on the total amount of said composition, of an inorganic pigment,
   an anionic sodium salt dispersant or anionic amine salt dispersant and an anionic ammonium salt dispersant, and
   water or a solvent miscible with water; and a phosphor layer formed on said pigment layer, said phosphor layer emitting light of the same color as the color of the pigment itself,
   wherein said pigment and phosphor layers are stripe-like or dot-like.

4. A display apparatus comprising:
   a face plate having an inner surface;
   a phosphor screen comprising a pigment layer formed by applying a pigment dispersion composition on the inner surface of the face plate, the pigment dispersion composition comprising
   0.5 to 50% by weight, based on the total amount of said composition, of an inorganic pigment,
   an ammonium salt dispersant,
   a nonionic dispersant selected from the group consisting of a polyoxyalkylene alkylether, a polyoxyethylene nonylphenylether and a polyoxyethylene sorbitanmonolaurate, and
   water or a solvent miscible with water; and a phosphor layer formed on said pigment layer, said phosphor layer emitting light of the same color as the color of the pigment itself,
   wherein said pigment and phosphor layers are stripe-like or dot-like.

5. A display apparatus according to claim 1, wherein said pigment dispersion composition comprises an anionic sodium salt dispersant and an anionic ammonium salt dispersant.

6. A display apparatus according to claim 1, wherein said pigment dispersion composition comprises an anionic sodium salt dispersant or anionic amine salt dispersant selected from the group consisting of a sodium salt or amine salt of an acrylic resin, an acryl-styrene resin, an acryl copolymer resin, a polycarbonic acid, a condensation product of aromatic sulfonic acid and formalin.

7. A display apparatus according to claim 6, wherein said pigment dispersion composition comprises an anionic sodium salt dispersant and said anionic sodium salt dispersant is an acryl copolymer.

8. A display apparatus according to claim 1, wherein said anionic ammonium salt dispersant is selected from the group consisting of an ammonium salt of an acrylic resin, an acryl-styrene resin, an acryl copolymer resin, a polycarbonic acid, and a polyoxyethylene alkyl ether sulfate.

9. A display apparatus according to claim 6, wherein said anionic ammonium salt dispersant is selected from the group consisting of an ammonium salt of an acrylic resin, an acryl-styrene resin, an acryl copolymer resin, a polycarbonic acid, and a polyoxyethylene alkyl ether sulfate.

10. A display apparatus according to claim 9, wherein said anionic ammonium salt dispersant is an acryl copolymer.

11. A display apparatus according to claim 2, wherein said anionic ammonium salt dispersant is selected from the group consisting of an ammonium salt of an acrylic resin, an acryl-styrene resin, an acryl copolymer resin, a polycarbonic acid, and a polyoxyethylene alkyl ether sulfate.

12. A display apparatus according to claim 11, wherein said anionic ammonium salt dispersant is an acryl copolymer.

13. A display apparatus according to claim 11, wherein said nonionic dispersant and said anionic ammonium salt dispersant are present in a ratio of 1/30 to 1/300.

14. A display apparatus according to claim 3, wherein said pigment dispersion composition comprises an anionic sodium salt dispersant or anionic amine salt dispersant selected from the group consisting of a sodium salt or amine salt of an acrylic resin, an acryl-styrene resin, an acryl copolymer resin, a polycarbonic acid, a condensation product of aromatic sulfonic acid and formalin.

15. A display apparatus according to claim 14, wherein said anionic ammonium salt dispersant is selected from the group consisting of an ammonium salt of an acrylic resin, an acryl-styrene resin, an acryl copolymer resin, a polycarbonic acid, and a polyoxyethylene alkyl ether sulfate.

16. A display apparatus according to claim 15, wherein said anionic ammonium salt dispersant is an acryl copolymer.

17. A display apparatus according to claim 15, wherein said pigment dispersion composition comprises an anionic sodium salt dispersant.

18. A display apparatus according to claim 4, wherein said anionic ammonium salt dispersant is selected from the group consisting of an ammonium salt of an acrylic resin, an acryl-styrene resin, an acryl copolymer resin, a polycarbonic acid, and a polyoxyethylene alkyl ether sulfate.

19. A display apparatus according to claim 18, wherein said anionic ammonium salt dispersant is an acryl copolymer.

20. A display apparatus according to claim 18, wherein said nonionic dispersant and said anionic ammonium salt dispersant are present in a ratio of 1/30 to 1/300.

* * * * *